United States Patent
Park

(10) Patent No.: US 9,785,127 B2
(45) Date of Patent: Oct. 10, 2017

(54) POWER SUPPLY DEVICE, MICRO SERVER HAVING THE SAME, AND POWER SUPPLY METHOD

(71) Applicant: Samsung Electronics Co., Ltd., Suwon-si, Gyeonggi-do (KR)

(72) Inventor: Jeong-gyu Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 417 days.

(21) Appl. No.: 14/171,969

(22) Filed: Feb. 4, 2014

(65) Prior Publication Data
US 2015/0012151 A1 Jan. 8, 2015

(30) Foreign Application Priority Data
Jul. 2, 2013 (KR) .......................... 10-2013-0077305

(51) Int. Cl.
G05B 15/02 (2006.01)
G06F 1/26 (2006.01)
G06F 1/32 (2006.01)

(52) U.S. Cl.
CPC .............. G05B 15/02 (2013.01); G06F 1/26 (2013.01); G06F 1/3206 (2013.01)

(58) Field of Classification Search
CPC .......... G05B 15/02; G06F 1/26; G06F 1/3206
See application file for complete search history.

(56) References Cited

U.S. PATENT DOCUMENTS

| 6,166,455 | A | * | 12/2000 | Li | .......................... | H02J 1/102 |
| | | | | | | 307/43 |
| 6,614,133 | B2 | | 9/2003 | Belson et al. | | |
| 6,738,268 | B1 | | 5/2004 | Sullivan et al. | | |
| 8,035,356 | B2 | * | 10/2011 | Mentelos | ................ | H02J 9/061 |
| | | | | | | 320/166 |
| 8,237,423 | B2 | | 8/2012 | Heineman et al. | | |
| 2003/0080624 | A1 | | 5/2003 | Belson et al. | | |
| 2004/0003306 | A1 | | 1/2004 | Oomori | | |
| 2005/0008146 | A1 | | 1/2005 | Chheda et al. | | |
| 2006/0146461 | A1 | | 7/2006 | Jones et al. | | |
| 2008/0309301 | A1 | * | 12/2008 | Shimada | ............... | H02M 3/158 |
| | | | | | | 323/282 |

(Continued)

FOREIGN PATENT DOCUMENTS

| JP | 2003-153438 | 5/2003 |
| JP | 2006-318394 | 11/2006 |

OTHER PUBLICATIONS

Liang M Derwent Acc. No. 2013-P65822 Thomson Reuters p. 1.*

(Continued)

*Primary Examiner* — Charles E Anya
(74) *Attorney, Agent, or Firm* — Staas & Halsey LLP

(57) ABSTRACT

A power supply device to supply power to a micro server includes a plurality of power supplies configured to be redundant and supply DC power, and an output unit to output the DC power output from the plurality of power supplies to the micro server, wherein one of the plurality of power supplies operates in a master mode and the remaining power supplies operate in a slave mode, and wherein if a load of the micro server is less than or equal to a first predetermined load, at least one of the power supplies that operate in the slave mode does not output the DC power.

25 Claims, 12 Drawing Sheets

(56) References Cited

U.S. PATENT DOCUMENTS

| | | |
|---|---|---|
| 2009/0158070 A1 | 6/2009 | Gruendler |
| 2009/0172453 A1* | 7/2009 | Dishman .................. G06F 1/263 713/340 |
| 2010/0014330 A1 | 1/2010 | Chang et al. |
| 2010/0332857 A1* | 12/2010 | Vogman .................. G06F 1/263 713/300 |
| 2011/0055614 A1* | 3/2011 | Lin .......................... G06F 1/263 713/340 |
| 2011/0191612 A1* | 8/2011 | Itakura .................... H02J 3/005 713/320 |
| 2011/0316338 A1* | 12/2011 | Peterson ................. G06F 1/263 307/29 |
| 2012/0139339 A1* | 6/2012 | Yoon ........................ H02H 3/20 307/11 |
| 2012/0159202 A1 | 6/2012 | Xu et al. |
| 2012/0284539 A1* | 11/2012 | Cheng ...................... G06F 1/263 713/300 |
| 2012/0303993 A1* | 11/2012 | Nishtala .................... G06F 1/28 713/340 |
| 2013/0163297 A1* | 6/2013 | Phadke ..................... H02J 3/26 363/65 |
| 2013/0232362 A1* | 9/2013 | Zhou ....................... G06F 1/263 713/323 |
| 2014/0268947 A1* | 9/2014 | Phadke ................... H02J 1/102 363/69 |
| 2014/0372066 A1* | 12/2014 | Coq .......................... G06F 1/26 702/108 |

OTHER PUBLICATIONS

Extended European Search Report dated Sep. 1, 2015 in corresponding European Patent Application No. 14160364.7.

Search Report and Written Opinion dated May 8, 2014 issued in International Application No. PCT/KR2014/000666.

\* cited by examiner

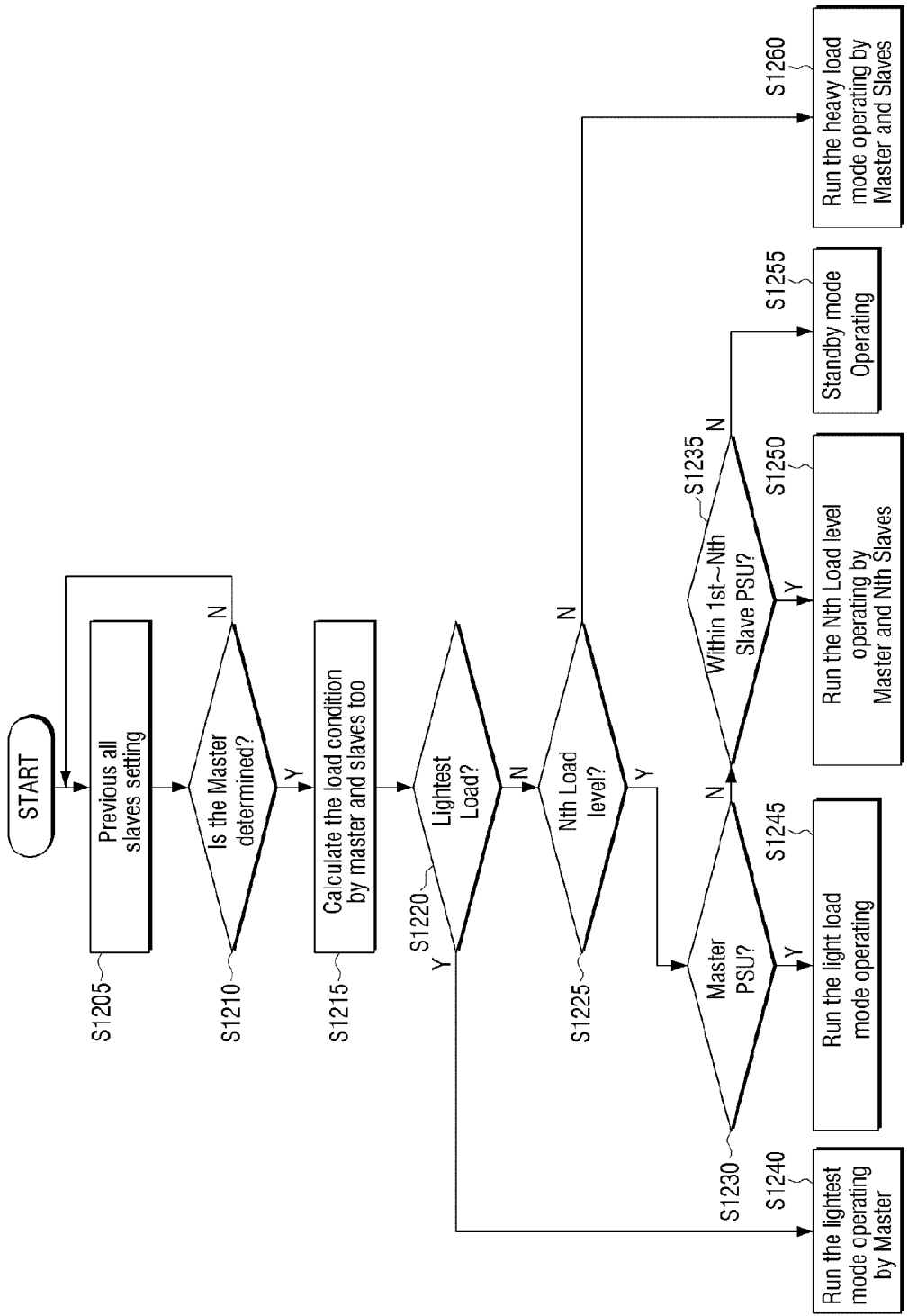

POWER SUPPLY DEVICE, MICRO SERVER HAVING THE SAME, AND POWER SUPPLY METHOD

CROSS-REFERENCE TO RELATED APPLICATIONS

This application claims priority under 35 U.S.C. §119(a) from Korean Patent Application No. 2013-0077305 filed Jul. 2, 2013 in the Korean Intellectual Property Office, the disclosure of which is incorporated herein by reference in its entirety.

BACKGROUND OF THE INVENTION

1. Field of the Invention

The present general inventive concept relates to a power supply device, a micro server having the same, and a power supply method. More particularly, the present general inventive relates to a power supply device that can operate selectively a plurality of power supplies depending on load, a micro server having the same, and a power supply method.

2. Description of the Related Art

Due to recent advancements in high-speed Internet and intranet technologies, server technology that allows a large amount of data to be processed at high speed has been developed. Accordingly, rack-mount cluster server technology has emerged, but has problems due to its bulkiness and significantly high amount of power consumption. Furthermore, since server modules are connected with each other by cables in a rack-mount cluster setting, system expansion is limited.

To solve the above problems, a micro server that uses a processor module has been developed. The processor module refers to a thin, modular expansion server that is inserted and operated in a main body of a micro server system, and does not include stacking rack servers horizontally like the rack-mount servers. The micro server is referred to as a high-density server in the sense that a large number of servers can be inserted and installed in a narrow space. The micro server contains key elements of the server such as at least one central processing unit (CPU), a memory device, an operating system, etc., and performs functions as a server by using power, input and output, incidental devices, and various control functions supported by the main body.

In order to ensure reliable and smooth operation of the server, the power supply device of the server has been designed to be redundant to compensate for any potential power supply failure.

However, in the sense that the power supply device of the server is designed to operate at the highest level of efficiency in a load of a specific region due to primary/secondary transformer design characteristics, a plurality of power supplies configured as the redundant power supply device supplies power to the server system at an equal rate. As a result, the efficiency of the server system is less than 50% in a low load condition.

Moreover, since the efficiency of a power supply unit (PSU) is lessened, a main power supply device eventually results in a power loss of the whole system. Accordingly, efficient design and operation of the power supply device implementing a plurality of PSUs in parallel is required. However, since the overall system loads are supplied in parallel, the PSUs are driven in the undesired low load condition such that a large amount of loss is generated.

In particular, since loss caused by power delivery occupies a large proportion of the power management in data centers, servers, etc., there is a need for a high-efficiency design of the power supply.

SUMMARY OF THE INVENTION

The present general inventive concept provides a power supply device that can selectively operate a plurality of power supplies depending on a load condition, a micro server having the same, and a power supply method.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a power supply device to supply power to a micro server, which may include a plurality of power supplies configured to be redundant and supply DC power, and an output unit to output the DC power output from the plurality of power supplies to the micro server, wherein one of the plurality of power supplies operates in a master mode and the remaining power supplies operate in a slave mode, and wherein if a load of the micro server is less than or equal to a first predetermined load, at least one of the power supplies that operate in the slave mode does not output the DC power.

The power supplies may equally divide and output an amount of current corresponding to the load of the micro server except the power supply that does not output the DC power.

If the load of the micro server is greater than or equal to a second predetermined load, the power supply that does not output the DC power among the power supplies that operate in the slave mode may output the DC power.

The second predetermined load may be greater than the first predetermined load.

The power supply that operates in the slave mode may include a plurality of power supplies, and a number of power supplies corresponding to the load of the micro server among the plurality of power supplies that operates in the slave mode operate.

Each of the plurality of power supplies that operates in the slave mode may output or may not output the power to the micro server according to a predetermined order.

Each of the plurality of power supplies may include a rectifier adapted to rectify external AC power, a power factor correction (PFC) adapted to match voltage and current of the rectified AC power with a same phase, a first capacitor adapted to smooth the AC power having the voltage and current matched with the same phase, a DC/DC converter adapted to transform the smoothed AC power, an output capacitor adapted to output the transformed AC power, a switch adapted to selectively output DC power stored in the output capacitor, and a power controller adapted to control the switch to be turned off if a malfunction is detected in the power supplies.

The power controller may detect a size of a connected load, share the detected load size with other power supply device, and determine at least one operation mode of the master mode and the slave mode depending on the shared load size.

The power controller may detect a size of the load of the micro server, and, if the detected load of the micro server is less than or equal to the first predetermined load, control the switch so that the DC power is not output.

Even when the DC power is determined not to be output, the power controller may maintain the first capacitor and the output capacitor in a state charged with electric charges.

The foregoing and/or other features and utilities of the present general inventive concept may also be achieved by providing a micro server including a plurality of processor modules, and a power supply device adapted to supply power to each of the plurality of processor modules by using a plurality of power supplies that is configured to be redundant and supplies DC power, wherein the power supply device may classify each of the plurality of power supplies as a master power supply or a slave power supply, and, if load in the micro server is less than or equal to a first predetermined load, the power supply device may not allow the power supply that is classified as the slave power supply to supply the power.

The power supplies may equally divide and output an amount of current corresponding to the load in the micro server except the slave power supply that does not output the power.

If the load of the micro server is greater than or equal to a second predetermined load, the power supply that does not output the DC power among the slave power supplies may output the DC power.

The slave power supply may include a plurality of slave power supplies, and a number of slave power supplies corresponding to the load of the micro server may not output the DC power.

Each of the plurality of slave power supplies may not output the power to the micro server according to a predetermined order.

Each of the plurality of power supplies may include a rectifier adapted to rectify external AC power, a power factor correction (PFC) adapted to match voltage and current of the rectified AC power with a same phase, a first capacitor adapted to smooth the AC power having the voltage and current matched with the same phase, a DC/DC converter adapted to transform the smoothed AC power, an output capacitor adapted to output the transformed AC power, a switch adapted to selectively output DC power stored in the output capacitor, and a power controller adapted to control the switch to be turned off if a malfunction is detected in the power supplies, wherein the power controller may detect a size of the load of the micro server, if the detected load of the micro server is less than or equal to the first predetermined load, the power controller may control the switch so that the DC power is not output, and, even when the DC power is determined not to be output, the power controller may maintain the first capacitor and the output capacitor in a state charged with electric charges.

The foregoing and/or other features and utilities of the present general inventive concept may also be achieved by providing a power supply method of supplying power to a micro server including supplying the power to the micro server by using a plurality of power supplies that is configured to be redundant and supplies DC power, classifying each of the plurality of power supplies as a master power supply or a slave power supply, detecting load in the micro server, and allowing, if the detected load is less than or equal to a first predetermined load, at least one of the power supplies that is classified as the slave power supply not to supply the power to the micro server.

The supplying the power may include the plurality of power supplies that equally divides and outputs an amount of current corresponding to the load in the micro server.

The power supply method may include allowing, if the load in the micro server is greater than or equal to a second predetermined load, the power supply that does not output the DC power to output the DC power.

The slave power supply may include a plurality of slave power supplies, and the allowing at least one of the power supplies that is classified as the slave power supply not to supply the power to the micro server may include allowing a number of the slave power supplies corresponding to the load of the micro server not to supply the power.

The allowing at least one of the power supplies that is classified as the slave power supply not to supply the power to the micro server may include allowing the plurality of slave power supplies not to supply the power sequentially in a predetermined order.

Each of the plurality of power supplies may include at least one capacitor, and the allowing at least one of the power supplies that is classified as the slave power supply not to supply the power to the micro server may include the power supply determined not to supply the power that maintains the at least one capacitor therein in a state charged with electric charges.

The foregoing and/or other features and utilities of the present general inventive concept may also be achieved by providing a power supply device to supply power to a micro server, including a power supply to operate in a master mode to output power, and at least one other power supply to operate in a slave mode such that the at least one other power supply does not output power in response to a size of a load of the micro server being reached by the power supply.

The at least one other power supply may include a plurality of power supplies.

Each of the plurality of power supplies may output power until the size of the load of the micro server is reached, such that any remaining of the plurality of power supplies does not out power.

Each one of the plurality of power supplies may be assigned a predetermined priority.

The power supply in the master mode may output a largest amount of current during initial supply of power as compared to the at least one other power supply.

BRIEF DESCRIPTION OF THE DRAWINGS

These and/or other aspects and advantages of the present disclosure will become apparent and more readily appreciated from the following description of the embodiments, taken in conjunction with the accompanying drawings of which:

These and/or other features and utilities of the present general inventive concept will become apparent and more readily appreciated from the following description of the embodiments, taken in conjunction with the accompanying drawings of which:

FIG. 12 is a flowchart illustrating an operation of a power supply according to an exemplary embodiment of the present general inventive concept.

DETAILED DESCRIPTION OF THE PREFERRED EMBODIMENTS

Figure 1:
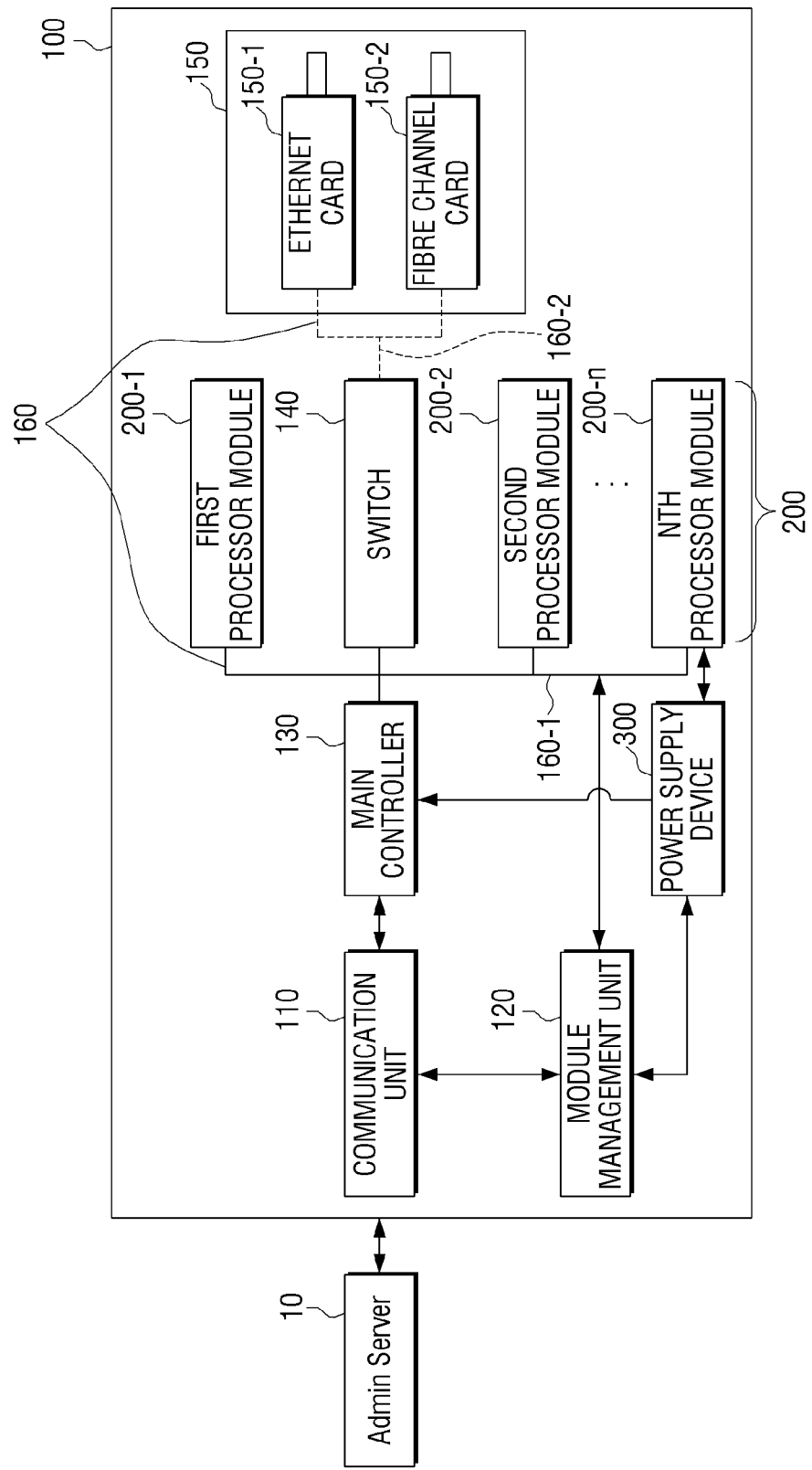
FIG. 1 is a block diagram illustrating a configuration of a micro server according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments.

FIG. 1 is a block diagram illustrating a configuration of a micro server 100 according to an exemplary embodiment of the present general inventive concept.

Referring to FIG. 1, the micro server 100 according to an exemplary embodiment of the present general inventive concept includes a communication unit 110, a module management unit 120, a main controller 130, a switch 140, an I/O device unit 150, a common interface bus 160, a plurality of processor modules 200, and a power supply device 300.

Although not illustrated, the communication unit 110, the module management unit 120, the switch 140, the I/O device unit 150, and the common interface bus 160 may be formed on a base board (e.g., an electronic breadboard), and the plurality of processor modules 200 may be mounted or demounted through slots formed in the base board. Also, the power supply device 300 may be mounted or demounted through the slots formed in the base board.

The communication unit 110 performs communication with an administration server 10. In detail, the communication unit 110 includes a network controller and a LAN port, and allows the module management unit 120 to perform communication with the administration server 10. Here, the communication unit 110 may perform communication with the administration server 10 through a network channel to perform server management (00B; out of band) that is separated from a network channel to perform a service of the micro server 100. In the exemplary embodiment as illustrated in FIG. 1, the communication unit 110 may perform communication with the administration server 10 through the wired LAN port, but the communication unit 110 may also be implemented to perform communication with the administration server 10 by wireless communication methods as well as other wired communication methods besides the LAN method.

The module management unit 120 is a baseboard management controller (BMC). Here, the BMC refers to a micro processor that is mounted in a server to support an intelligent platform management interface (IPMI). The BMC may collect operation state information of the power supply device 300, state information of the plurality of processor modules (e.g., (central processing unit (CPU) type, CPU information such as the number of operating clock, etc., whether the processor module operates, whether power is supplied, shares of processes, etc.), and whether a fan operates, may transmit the collected information to the administration server 10 through the communication unit 110, and may perform operation depending on the control of the external administration server 10.

Here, the IPMI is an open-standard hardware management interface specification defining a specific method by which embedded management subsystems can communicate, and performs monitoring, logging, recovery, inventory, and hardware control for the processor module. The exemplary embodiment as illustrated in FIG. 1 includes the module management unit 120 to collectively collect state information of the plurality of processor modules and to transmit the state information to the administration server 10. However, the present general inventive concept may be implemented so that each of the processor modules is equipped with a component corresponding to the module management unit 120, and transmits the state information to the administration server 10.

The main controller 130 controls each component of the micro server 100. In detail, the main controller 130 may control the switch 140 to transmit data transmitted through the I/O device unit 150 to each of the processor modules 200 by using the common interface bus 160.

Then, the main controller 130 may control each of the processor modules 200 mounted in the micro server 100 to configure a specific system such as a web server, an FTP server, a mail server, a database server, etc. For example, when being used as a web server to allow multiple users access thereto at the same time (i.e., simultaneously), the main controller 130 may control the processor modules 200 so that more processor modules are used to a web page to be accessed or may allow a connected web caching processor to perform the corresponding process only by connection with the high-speed internet.

The switch 140 may selectively connect the I/O device unit 150 and the plurality of processor modules. In detail, the switch 140 selectively connects any one of the plurality of processor modules 200 according to the control of the main controller 130 so that data is transmitted and received between the I/O device unit 150 and the processor module 200.

Then, the switch 140 may be configured with a peripheral component interconnect (PCI) express switch circuit (or multi root aware (MRA) PCIe switch), and may selectively control connection relation between the plurality of processor modules 200 and at least one I/O card.

The switch 140 may be implemented through I/O virtualization technology. The I/O virtualization technology may include technology to allow the plurality of processor modules 200 to use at the same time a single I/O card.

Since the switch 140 can adjust a connection structure between the processor module 200 and the I/O device unit 150, the connection structure of the processor module 200 may be adjusted without changing the physical location of the I/O device unit 150 and the processor module 200.

The I/O device unit 150 includes at least one I/O card, and sends and receives data to and from the outside of the micro server 100. Here, the I/O card may be implemented as an Ethernet card 150-1, a fibre channel card 150-2, etc.

Then, the I/O device unit 150 may send and receive data to and from external devices or external networks. Here, the data may be sent to or received from the processor module 200 through the PCI express interface. Connection between the processor module 200 and the I/O device unit 150 may be controlled by the switch 140.

The common interface bus 160 is a connection device to connect components of the micro server 100. In detail, the common interface bus 160 may perform two-way communication or half-duplex communication depending on the control of the main controller 130. The common interface bus 160 may include a first interface bus 160-1 to connect control command signals and a second interface bus 160-2 to connect data signals.

The common interface bus 160 may also support at least one of an inter-integrated circuit ($I^2C$) interface, a peripheral component interconnect (PCI) express interface, and a system management bus (SMBUS) interface. Accordingly, the first interface bus 160-1 to connect control command signals may be the $I^2C$ interface or the SMBUS interface, and the second interface bus 160-2 to connect data signals may be the PCI express interface. Then, communication between the module management unit 120 and the processor module 200 may be performed through the first interface bus 160-1 that supports the $I^2C$ interface or the SMBUS interface.

Here, the $I^2C$ interface is a bus specification that was developed to perform communication between a central processing apparatus and low-speed peripheral apparatuses, and uses two strands of wires so that it is also called as a two wire interface (TWO. The $I^2C$ interface bus is a synchronous communication method, consists of clock signals and data signals, and can perform two-way communication with a master device regardless of the number of slave devices. Also, two or more master devices may be placed on a single bus, and the slave devices can be added or removed even while the $I^2C$ interface bus is operating. Accordingly, the main controller 130 and the module management unit 120 as described above may be operated as the master devices, and the plurality of processor modules 200 as described above may be operated as the slave devices.

The PCI Express interface is a local bus specification with a serial structure that maintains software-compatible with conventional peripheral component interconnect (PCI) parallel interface buses and is improved to perform high-speed input and output between devices. The PCI express interface is suitable to process large amounts of data. In this regard, in the exemplary embodiment as illustrated in FIG. 1, data is delivered to each of the processor modules 200 through the PCI Express interface bus of the common interface bus 160-2 according to the control of the main controller 130.

The SMBUS interface is a simple two-wire bus to be used to communicate with low-speed devices on a motherboard, transfers clock, data, and command, and is an interface based on $I^2C$ serial bus protocol.

In detail, data received from the I/O device unit 150 may be transmitted to the processor module 200 selected by the switch 140 through the PCI Express interface. Here, the switch 140 may select the processor module 200 to which the data will be transmitted under the control of the main controller 130.

The processor module 200 is a module that contains key components of a server such as a CPU, a memory device, an operating system, etc., and functions as a server by using power, input and output, incidental devices, and various control functions supported by the micro server 100.

The processor module 200 is connected to the main controller 130 through the common interface bus 160. In detail, the processor module 200 includes a module controller 220 to relay connection between the common interface bus 160 and an interface that is used by a CPU mounted on the processor module 200.

Then, the processor module 200 is connected to the module management unit 120 through the common interface bus 160.

The power supply device 300 supplies power to each component within the micro server 100. In detail, the power supply device 300 is provided with a plurality of power supplies and has more excessive power capacity than the maximum power capacity required by the micro server 100. The power supply device 300 may supply power to each component within the micro server 100 by driving the plurality of power supplies in a current sharing method. Then, the power supply device 300 may supply power to the micro server 100 by using some of the plurality of power supplies depending on a size of load in the micro server 100. The detailed configuration and operation of the power supply device 300 will be described later with reference to FIG. 2.

As described above, since the micro server 100 according to FIG. 1 uses the power supply device 300 that is designed to be more excessive than the size of the maximum power required by the micro server 100, it can operate reliably even when one power supply within the power supply device 300 is broken down. Then, since the micro server 100 uses the power supply device 300 that operates some of the plurality of power supplies adaptively depending on the size of load in the micro server 100, it can operate at high power efficiency.

In the description of FIG. 1, the micro server 100 has three processor modules 200. However, the micro server 100 may be implemented to have two processor modules or four or more processor modules.

Also, in the description of FIG. 1, the communication unit 110 and the module management unit 120 are implemented separately. However, the functions of the module management unit 120 and communication unit 110 may be implemented by a single component.

Figure 2:
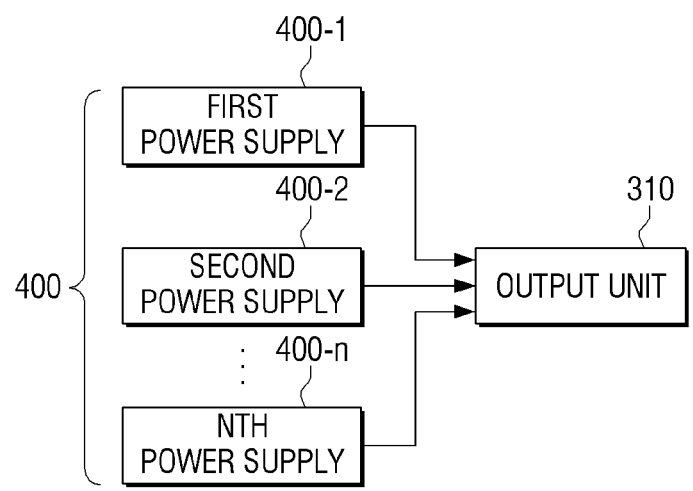
FIG. 2 is a block diagram illustrating a configuration of a power supply device of FIG. 1.

FIG. 2 is a block diagram illustrating a configuration of a power supply device 300 of FIG. 1.

Referring to FIG. 2, the power supply device 300 includes a plurality of power supplies 400 and an output unit 310. In detail, the power supply device 300 includes the plurality of power supplies 400 to provide a stable power supply even when one power supply fails. The number of the power supplies 400 that are contained in the power supply device 300 may vary depending on the capacity of the power supply, but the power supply device 300 may include one more power supply in addition to the number of power supplies 400 that meets the maximum load required in the micro server 100. For example, the micro server 100 that requires the maximum power of 10 kW may include three power supplies 400-1, 400-2, and 400-n, each of which can generate power of 5 kW.

The plurality of power supplies 400-1, 400-2, and 400-n outputs DC power of a predetermined size in a current sharing method. Here, the current sharing method is a way that each power supply is in charge of and outputs by 1/n (here, n is the number of the power supplies 400) of current required by the system. The current sharing method may be divided into a passive current sharing method and an active current sharing method. Most recent power supplies of a server follow the active current sharing method, and the master/slave current sharing method of the active current sharing method is the most widely used. Accordingly, hereinafter the plurality of power supplies 400 will be described to share current in the master/slave method. However, the present general inventive concept is not limited to the master/slave method, and other active current sharing method or the passive current sharing method may be applied to the present general inventive concept. Here, the master/slave method is a way to set a power supply having the greatest output current among N power supplies 400 to operate as the master.

In the sense that the plurality of power supplies 400-1, 400-2, and 400-n operates in the current sharing method, one of the plurality of power supplies 400 operates in the master mode, namely, as a master power supply, and the remaining power supplies 400 may operate in the slave mode, namely, as slave power supplies. This operation mode of each of the power supplies 400 is determined in an early on process of the power supply device 300. In detail, a power supply 400 that outputs the most amount of current during initial supply of power may be determined as the master power supply, and the rest power supplies may be determined as the slave power supply. Such determining operation may be performed by each of the power supplies 400.

On the other hand, when there is a plurality of slave power supplies, namely, when the power supply device 300 includes three or more power supplies 400, priorities between the pluralities of slave power supplies are determined. Such priorities may be determined by an external device, and may be performed in each of the power supplies 400 in the early on process. Alternatively, such priorities may be preset default in the factory of the power supplies 400.

The plurality of power supplies 400-1, 400-2 and 400-n equally divides and outputs the amount of current corresponding to the size of the load in the micro server 100. For example, if the amount of current corresponding to the size of the load in the micro server 100 is 9 A and the power supply device 300 includes three power supplies 400, each of the power supplies 400 can output the amount of current by 3 A.

The plurality of power supplies 400-1, 400-2 and 400-n may operate so that only the number of power supplies 400 corresponding to the size of the load in the micro server 100 output DC power. In detail, if the size of the load in the micro server 100 is a first predetermined load, the plurality of power supplies 400-1, 400-2 and 400-n may operates so that at least one of the power supplies 400 that operate in the slave mode does not output power. For example, if each power supply can operate at maximum efficiency at 5 A and the size of current load in the micro server 100 is 8 A, the micro server 100 can be supplied with enough power by operation of two power supplies. Accordingly, only two power supplies 400 of the plurality of power supplies 400 may supply power and the remaining one power supply 400 may not supply power. At this time, the power supplies 400 to supply the power are the master power supply and the slave power supply with a high priority, and the power supply 400 not to supply the power is the slave power supply with a low priority. In this state, since only two power supplies 400 operate, the two power supplies 400 may divide the amount of current of 8 A corresponding to the size of the load in the micro server 100, and output by 4 A, respectively.

Alternatively, if each power supply 400 can operate at maximum efficiency at 5 A and the size of current load in the micro server 100 is 4 A, the micro server 100 can be supplied with enough power by operation of only one power supply 400. Accordingly, only one power supply 400 may supply power and the remaining two power supplies 400 may not supply power. At this time, the power supply 400 to supply power is the master power supply as described above, and the power supplies 400 not to supply power are slave power supplies. In this state, since only one power supply 400 operates, the power supply 400 in operation alone outputs the amount of current corresponding to the load size in the micro server 100.

On the other hand, in the state that some of the plurality of power supplies 400 does not operate, if the load required in the micro server 100 increases, the power supply 400 that did not output power outputs power according to the size of the increased load. In detail, if the load in the micro server 100 is greater than or equal to a second predetermined load, a power supply 400 that did not output DC power among the power supplies 400 that operate in the slave mode may again output the DC power. The second load may be the same as or greater than the first load.

Even if it does not output DC power, each of the plurality of power supplies 400-1, 400-2, and 400-n maintains internal capacitors thereof in a state charged with electric charges in order to just output DC power. Such operation will be described later with reference to FIG. 3.

The output unit 310 outputs the DC power being output from the plurality of power supplies 400-1, 400-2, and 400-n to the micro server 100.

As described above, since the power supply device 300 according to FIG. 2 is over-designed than the size of the maximum power required by the micro server 100, even if one power supply 400 fails, it can supply power reliably. Also, since the power supply device 300 operates some of the plurality of power supplies 400 adaptively according to the size of the load in the micro server 100, it can operate at high power efficiency.

On the other hand, the power supply device 300 according to the exemplary embodiment of FIG. 2 is illustrated and explained to be applied only to the micro server 100. However, the power supply device 300 it can be applied to any electronic device other than the server as long as it requires over-design.

Also, in the description of FIG. 2, when the load required by the system is small, the slave power supply does not operate. However, the present general inventive concept may be implemented so that when the load is small, the master power supply does not operate.

Further, in the description of FIG. 2, each of the power supplies 400 determines an operation mode, and individually performs operation according to the detected load. However, the present general inventive concept may be implemented so that a separate controller to control the plurality of power supplies 400 is provided, and the controller controls the operation mode and operation state of each of the plurality of power supplies.

Figure 3:
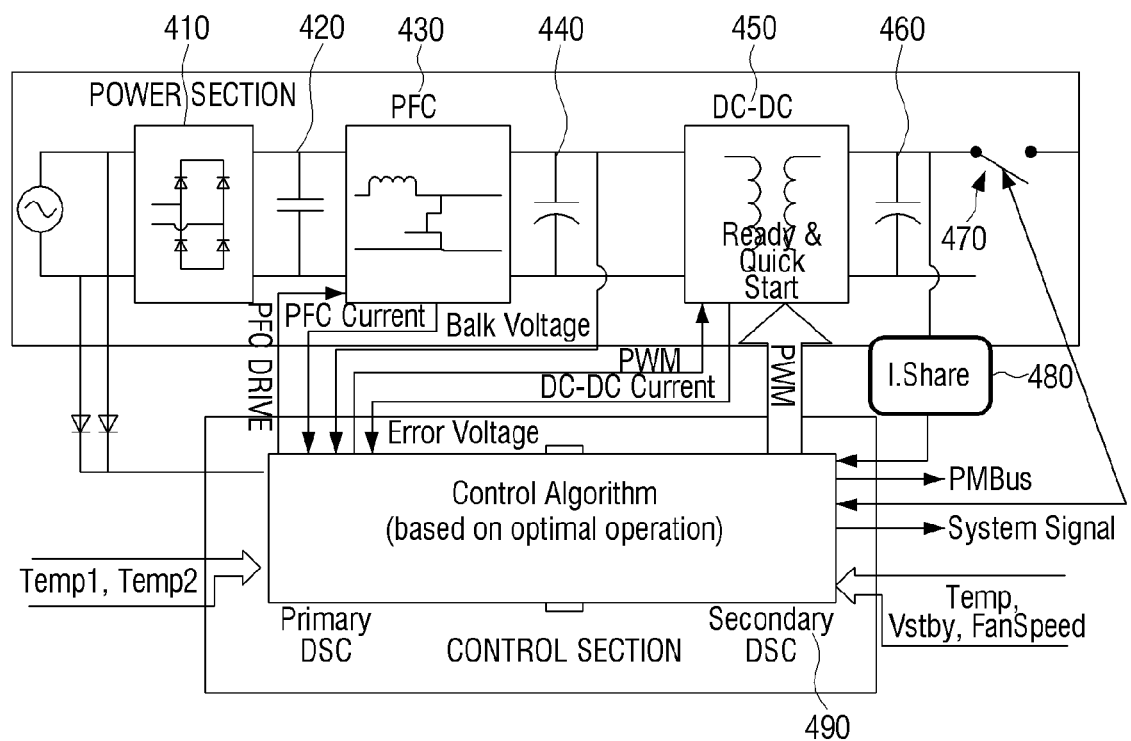
FIG. 3 is a block diagram illustrating a configuration of a power supply of FIG. 2.

FIG. 3 is a block diagram illustrating a configuration of a power supply 400 of FIG. 2.

Referring to FIG. 3, the power supply 400 may include a rectifier 410, a first capacitor 420, a power factor correction (PFC) 430, a second capacitor 440, a DC/DC converter 450, an output capacitor 460, a switch 470, a current sharing unit 480, and a power controller 490.

Figure 5:
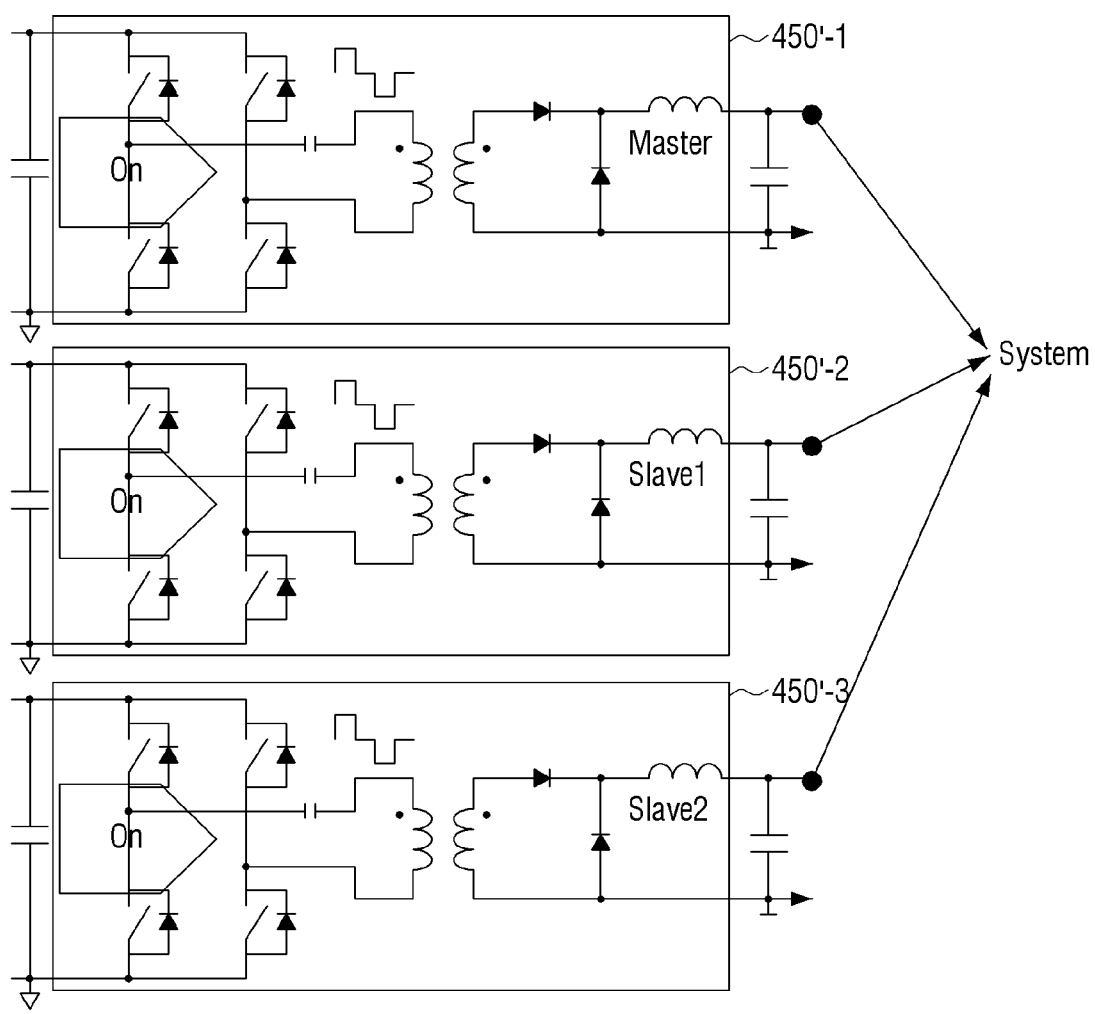

The rectifier 410 rectifies external AC power. The rectifier 410 may be implemented by a full-bridge all wave rectifying circuit as illustrated in FIG. 5. As illustrated in FIG. 3, the rectifier may be configured by using the full-bridge all wave rectifying circuit. However, the rectifier may be implemented by using any other type of rectifying circuit.

The first capacitor 420 smoothes the power output from the rectifier 410. The power supply 400 may be implemented in the form that the first capacitor 420 is omitted.

The power factor correction 430 allows the voltage and current of the rectified AC power to be matched with the same phase. In detail, the power factor correction 430 may allow the voltage and current the AC power that was rectified in the rectifier 410 to be matched with the same phase.

The second capacitor (or C-link) 440 smoothes the AC power of which the voltage and current are matched with the same phase. In detail, the second capacitor 440 may smooth the AC power being output from the power factor correction 430 into DC power having a predetermined size.

Figure 4:
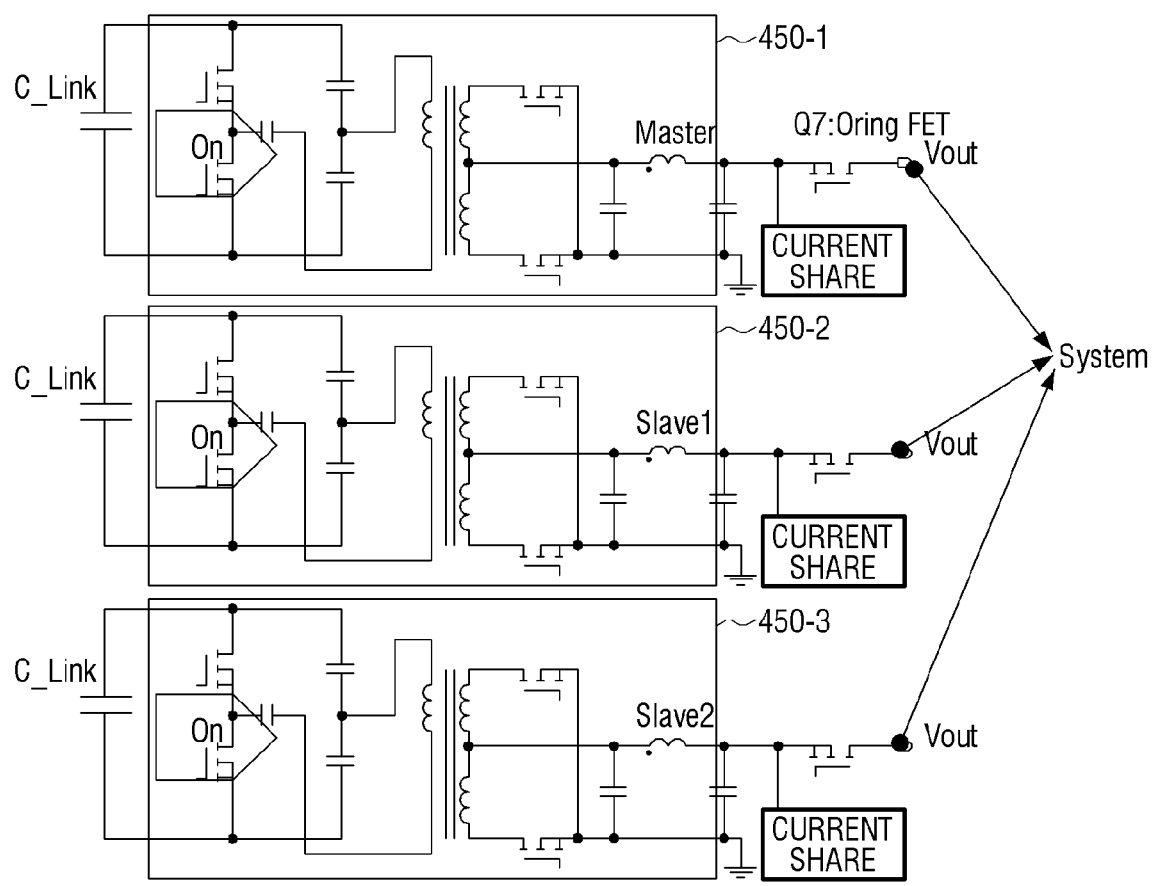
FIGS. 4 and 5 are circuit diagrams illustrating examples of a DC/DC converter of FIG. 3.

The DC/DC converter 450 transforms the smoothed AC power. In detail, the DC/DC converter 450 may transform the DC power having the predetermined size being output from the second capacitor 440 into voltage of a size required by the micro server 100 according to a control signal (PWM) of the power controller 490. The DC/DC converter 450 may be a full bridge SMPS including DC/DC converters 450-1, 450-2, and 450-3, as illustrated in FIG. 4, or a half bridge SMPS including DC/DC converters 450-1', 450-2', and 450-3', as illustrated in FIG. 5. As illustrated in FIG. 3, the DC/DC converter 450 is implemented by using only SMPS. However, the DC/DC converter may be implemented to include an electric transformer.

The output capacitor 460 smoothes and outputs the transformed AC power. In detail, even if the power supply 400 does not operate, namely, even if the power supply 400 does not operate due to small output load of the system, the output capacitor 460 may be charged with electrical charges in order to quickly output power when the power supply 400 will operate again due to failure of other power supply 400 or increase of the load.

The switch 470 selectively outputs the transformed AC power. In detail, the switch 470 has a first end that is commonly connected with one end of the output capacitor 460 and one of output ends of the DC/DC converter 450 and a second end that is connected to the output unit 310. The switch 470 may be turned on or off selectively according to the control of the power controller 490. The switch 470 may be an ORing FET switch. Although FIG. 4 illustrates that only one switch component is used, the switch 470 may be implemented to have two or more switch components.

The current sharing unit 480 is configured to monitor in common the current of one power supply 400 and the current of another power supply 400. In detail, the current sharing unit 480 provides its output current to a current sharing unit of other power supply 400, and acquires current information output from the other power supply 400. The power controller 490 that will be described later may measure the load condition of the system, or check an operation mode of its own and whether other power supply 400 fails through the configuration of the current sharing unit 480.

The power controller 490 controls all components of the power supply 400. In detail, the power controller 490 may control the power factor correction 430 and the DC/DC converter 450 to output current corresponding to the required load. Such control operation is the same as the control operation of the conventional power supply 400, and therefore, detailed description thereof will be omitted. The power controller 490 may be implemented by a digital signal processing (DSP) or a microprocessor that processes control operations as described above and will be described below based on digital signals. If the power controller 490 is implemented by the DSP, the power controller 490 may include analog logics that convert external analog signals into digital signals or digital outputs of the DSP into analog signals.

Then, the power controller 490 detects whether the power supply 400 is malfunctioning. In detail, the power controller 490 may detect whether current flows in through the output end, whether the output end outputs over-voltage greater than a predetermined voltage, or whether the output end outputs over-current greater than a predetermined current.

Then, if malfunction of the power supply 400 is detected, the power controller 490 may control the switch 470 to block connection with the output end. Since when the switch 470 is turned off by such operation, current being output from the corresponding power supply 400 becomes zero (0), the other power supply 400 can recognize that an error has occurred in a specific power supply 400 through the above-described current sharing unit 480. Accordingly, the power controller 490 may detect whether other power supplies 400 fail based on the amount of current detected by the current sharing unit 480.

Then, the power controller 490 determines the operation mode. In detail, during the initial operation, the power controller 490 measures the amount of output current of its own and the amount of output current of other power supply 400 by using the current sharing unit 480 and the PMBUS or I²C. Then, the power controller 490 compares the measured amount of output current of its own and the measured amount of output current of the other power supply 400, and then, if the amount of output current of its own is the largest, the power controller 490 may determine its own operation mode as the master mode. In contrast, if the amount of output current of its own is not the largest, the power controller 490 may determine its own operation mode as the slave mode.

Then, the power controller 490 may determine the order of priority. In detail, if its own operation mode is determined as the slave mode and there is the other 400 power supply operating in the slave mode, the power controller 490 may determine priorities between the two power supplies 400 by using PMBUS or I²C. Such priorities may be predetermined by resisters or switches that are preset in GPIO in a factory, may be preset by a user, or may be determined based on the measurement amount of initial current. Alternatively, an external control component (e.g. a system management controller) determines the priorities, and then may notify the power controller 490 of the priorities.

Then, the power controller 490 measures the size of the load in the micro server 100 based on the amount of output current at the output end. The power controller 490 determines whether it outputs power based on the size of the measured load. In detail, if its own operation mode is the slave mode and the size of the load in the micro server 100 is less than or equal to a first predetermined load, the power controller 490 may not control the switch 470 to output DC power. As illustrated in FIG. 4, the power supply of which the operation mode is the slave mode does not output power. However, the present general inventive concept may be implemented so that the power supply 400 of which the operation mode is the master mode does not output power.

On the other hand, if a plurality of power supplies 400 operates in the slave mode, namely, if the power supply device 300 includes three or more power supplies 400, the power controller 490 of the power supply 400 that operates in the slave mode may not output DC power as it corresponds to a predetermined order. For example, if a first power supply is a master power supply 400, second and third power supplies 400 are slave power supplies, and the second power supply 400 has a higher priority than the third power supply 400, when the load less than or equal to the predetermined load is detected, the third power supply 400 may not output power. As illustrated in FIG. 3, the low-priority power supply 400 does not preferentially output power. However, the present general inventive concept may be implemented so that the high-priority power supply does not preferentially output power.

Also, power supplies 400 that operate in the slave mode may have first predetermined load values that are different from each other, respectively. For example, when the power supply device 300 includes three power supplies 400 that can output rated current of 5 A, the first load of a first slave power supply 400 may be set to 4 A, and the first load of a second slave power supply 400 may be set to 8 A. The predetermined load value of each of the power supplies 400 may be set by experiment or simulation results so that the power supply device 300 has optimal power supply 400 efficiency by the size of each load.

Then, when DC power is not output, the power controller 490 may control each of internal components to charge the internal capacitors with electric charges in response to the urgent power output. In detail, when urgent power supply 400 is required due to failure of other power supply 400, to perform a quick power output the power controller 490 may maintain each of internal capacitors in a state charged with electric charges even if it does not output power. Since each of the internal capacitors is charged with electric charges as described above, quick power output is possible for failure of one of the capacitors. Also, even if each of the internal capacitors is charged with electric charges, the power is not practically consumed to keep charging of the internal capacitors. Therefore, power consumption may be reduced.

If the size of the load in the micro server 100 is increased, namely, if the load of the micro server 100 is greater than the second predetermined load, the power controller 490 of the power supply that does not output DC power may control the switch 470 to output again DC power. The second load may be the same as or greater than the first load as described above. For example, if the power supply device 300 includes two power supplies that can output rated current of 5 A, when the load is less than or equal to 4 A, DC power may be set not to be output, and when the load is greater than or equal to 4.5 A, the DC power may be set to be output again. In other words, in order to prevent allowing and blocking the output of DC power from being frequently changed in a switching threshold, the power controller may be implemented to operate with a hysteresis level. Then, the system may be designed so that a controller responds more quickly to a voltage control loop with a certain margin than to a load current or a current control loop.

Then, the load values and the priorities of the power supplies 400 as described above may be stored in a storage component such as a 'load feedback option block' inside the power supply 400.

If malfunctions of other power supplies 400 are detected, the power controller 490 of the power supply 400 that does not output DC power may control the switch 470 to output again DC power.

As described above, since the power supply 400 according to FIGS. 2 through 5 does not operate when the load of the system is not large, power consumption may be reduced. Also, since even when the power supply 400 does not output power, it has charged the internal capacitors with electric charges, it can output power quickly as other power supply 400 fails.

Figure 6:
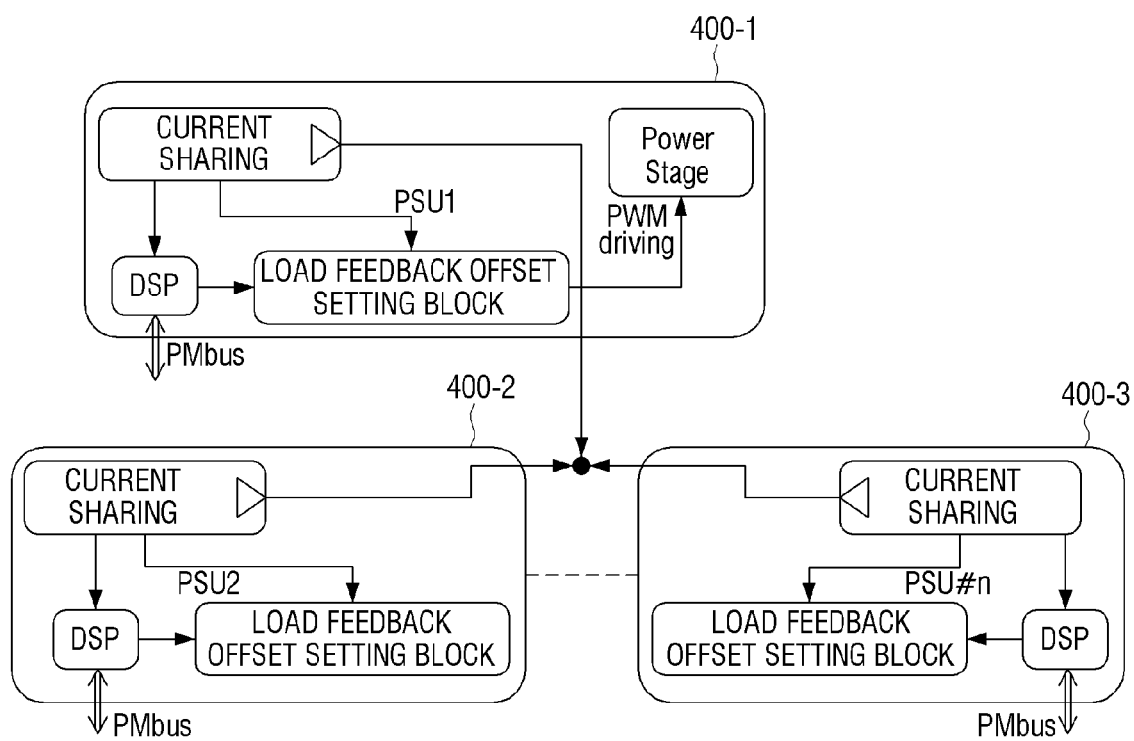
FIG. 6 is a view illustrating an operation of each power supply when a power supply device includes three power supplies according to an exemplary embodiment of the present general inventive concept.

FIG. 6 is a view illustrating an operation of each power supply 400 when a power supply device 300 includes three power supplies 400 according to an exemplary embodiment of the present general inventive concept.

Referring to FIG. 6, the power supply device 300 includes three power supplies 400-1, 400-2, and 400-3. During an initial operation the three power supplies 400-1, 400-2, and 400-3 output power, and thus one power supply 400-1 is determined as a master power supply and the other power supplies 400-2 and 400-3 are determined as slave power supplies depending on the size of current that is output from the power supplies 400. In the following description, it is assumed that a first power supply 400-1 operates in the master mode, and second and third power supplies 400-2 and 400-3 operate in the slave mode. Then, it is assumed that the second power supply 400-2 is a higher priority than the third power supply 400-3.

By the initial operation, the three power supplies 400-1, 400-2, and 400-3 equally share and output the amount of current that corresponds to the load size required by the system, respectively.

After the initial operation, if the load in the micro server 100 is less than or equal to the first predetermined load, the third power supply 400-3 with low-priority detects that the load of the micro server 100 is less than or equal to the first predetermined load, and determines that the third power supply 400-3 will not output power. Then, the third power supply 400-3 does not output power. At this time, the first power supply 400-1 may verify whether the voltage specification required by the system is satisfied when the third power supply 400-3 does not output power, and only if the voltage specification is satisfied, the first power supply 400-1 may not allow the third power supply 400-3 to output power.

Accordingly, only the first power supply 400-1 and the second power supply 400-2 output power. In this case, the first and second power supplies 400-1 and 400-2 may divide and output the current required by the micro server 100 in the current sharing method.

On the other hand, if the load in the micro server 100 is less than the third predetermined load that is smaller than the first predetermined load, the second power supply 400-2 detects that the load of the micro server 100 is less than or equal to the third predetermined load, and determines that the second power supply 400-2 will not output power. Then, the second power supply 400-2 does not output power.

Accordingly, only the first power supply 400-1 outputs power.

If the load in the micro server 100 increases in the state that only the first power supply 400-1 outputs power, the second power supply 400-2 detects the load of the micro server 100 is greater than or equal to a fourth predetermined load, and determines to output power. Then, the second power supply 400-2 outputs power.

Accordingly, only the first power supply 400-1 and the second power supply 400-2 output power. In this case, the first and second power supplies 400-1 and 400-2 may divide and output the current required by the micro server 100 in the current sharing method.

After that, if the load of the micro server 100 further increases to be more than or equal to the second load, the third power supply 400-3 detects the load of the micro server 100 is greater than or equal to the second predetermined load, and determines to output power. As a result, the first power supply 400-1, the second power supply 400-2, and the third power supply 400-3 output power.

The above description of the present general inventive concept describes the power supplies 400 during normal operation. The following description of the present general inventive concept will describe what occurs when one power supply 400 fails. A case when the first and third power supplies 400-1 and 400-3 operate normally while an error occurs in the second power supply 400-2 that operates in the slave mode will be described hereinafter.

The second power supply 400-2 where an error has occurred turns off a switch disposed in the output unit not to output power. Accordingly, the first and third power supplies 400-1 and 400-3 recognize that the second power supply 400-2 has failed by using the current sharing unit thereof, respectively.

Accordingly, the third power supply 400-3 that has not output power may output power the moment the third power supply 400-3 recognizes that the second power supply 400-2 failed. On the other hand, in the present embodiment, since the power supply not outputting power has charged the output capacitors with power to just output power, it can output power as soon as the error is detected.

The first and third power supplies 400-1 and 400-3 output power in the current sharing method. On the other hand, since the power supply device 300 according to FIG. 6 is designed to be redundant, two power supplies can output enough current required by the system.

Then the first power supply 400-1 that operates in the master mode may notify the controller of the micro server 100 that an error has occurred in the power supply device 300.

Hereinafter, a case that while the first and second power supplies 400-1 and 400-2 are outputting power, an error occurs in the first power supply 400-1 that operates in the master mode will be described.

When the error occurs, the first power supply 400-1 turns off the switch that is outputting power. Accordingly, the second and third power supplies 400-2 and 400-3 recognize that the first power supply 400-1 has failed.

Accordingly, the third power supply 400-3 that has not output power may output power the moment the third power supply 400-3 recognizes that the first power supply 400-1 failed. On the other hand, as illustrated in FIG. 6, since the power supply not outputting power has charged capacitors with power to just output power, it can output power as soon as the error is detected.

The second and third power supplies 400-2 and 400-3 output power in the current sharing method. On the other hand, since the power supply device 300 according to FIG. 6 is designed to be redundant, two power supplies can output current required by the system.

Then, the second power supply 400-2 may switch the operation mode to the master mode according to a predetermined sequence, and then notify the controller of the micro server 100 that an error has occurred in the power supply device 300.

Figure 7A:
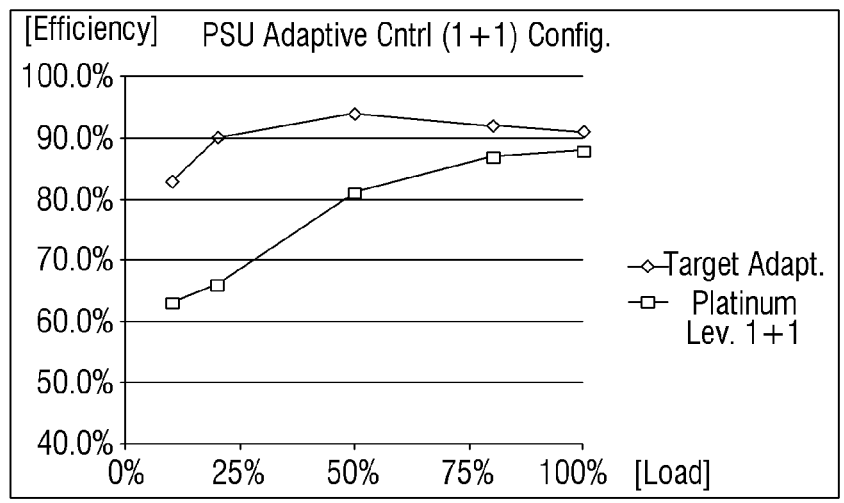
FIGS. 7A, 7B, 8A, and 8B are views illustrating power efficiency according to an exemplary embodiment of the present general inventive concept.
Figure 7B:
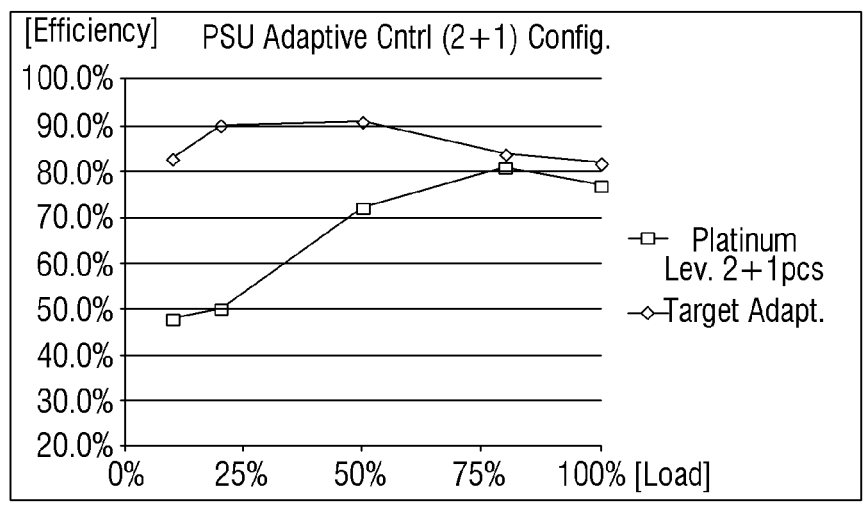
Figure 8A:
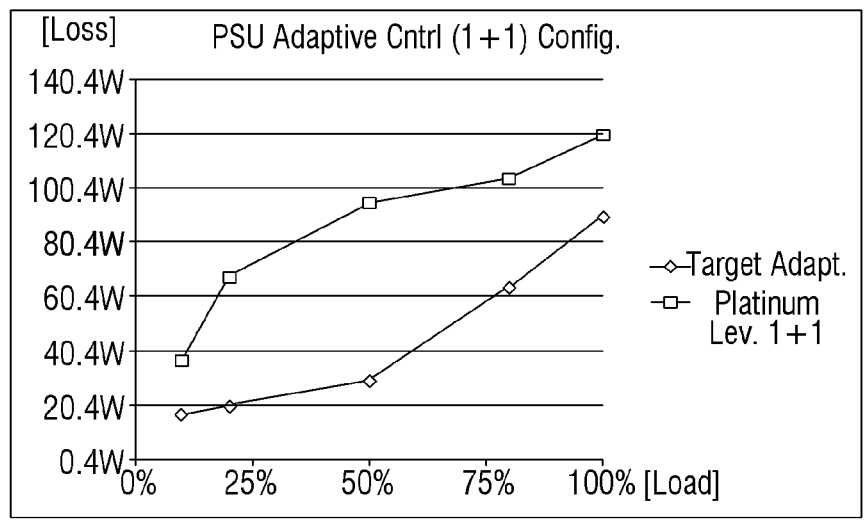
Figure 8B:
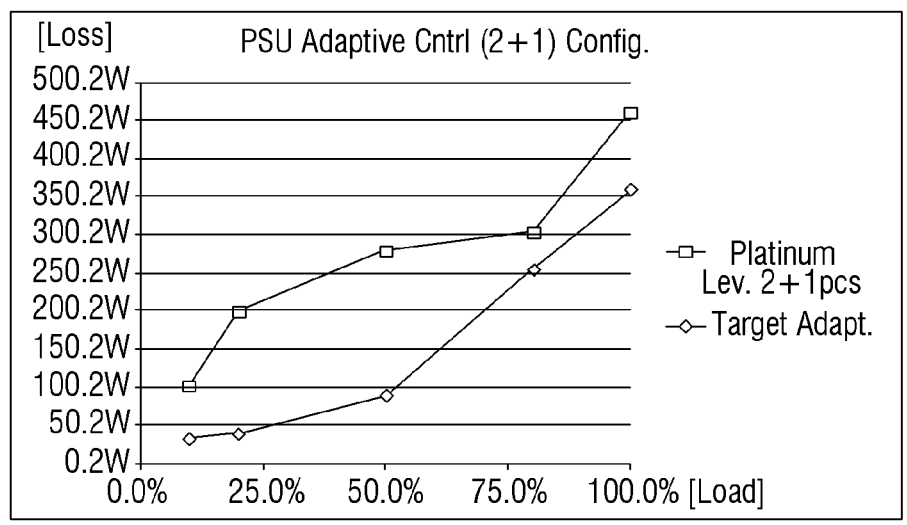

FIGS. 7A, 7B, 8A, and 8B are views illustrating power efficiency according to an exemplary embodiment of the present general inventive concept. In detail, FIGS. 7A and 7B are graphs illustrating efficiency of the power supply device 300 depending on load sizes, and FIGS. 8A and 8B are graphs illustrating loss depending on the load sizes.

Referring to FIG. 7A, when the power supply device 300 includes two power supplies 400, if the power supply device 300 is operated in a conventional way, the power supply device has a low efficiency when the load size is 25% to 75%. However, if the power supplies 400 are operated adaptively depending on the load size as illustrated in FIG. 7A, the power supply device 300 has a high efficiency up to 25% or more even in low-load. Furthermore, the power supply device 300 has a high efficiency more than 13% compared to the conventional even in a 50% load condition during which the micro server 100 operates for a majority of the time.

Referring to FIG. 7B, when the power supply device 300 includes three power supplies 400, if the power supply device 300 is operated in a conventional way, the power supply device 300 has a low efficiency when the load size is 25% to 75%. However, if the power supplies 400 are operated adaptively depending on the load size as illustrated in FIG. 7B, the power supply device 300 has a high efficiency even in low-load. In particular, there is efficiency difference of up to 40% therebetween in the 25% load condition.

Referring to FIG. 8A, when the power supply device 300 includes two power supplies 400, loss is reduced when the power supplies 400 are operated adaptively depending on the load size as illustrated in FIG. 8A, in contrast with a case when the power supply device 300 is operated in a conventional way.

Referring to FIG. 8B, when the power supply device 300 includes three power supplies 400, the loss is reduced when the power supplies 400 are operated adaptively depending on the load size as illustrated in FIG. 8B, in contrast with a case when the power supply device 300 is operated in a conventional way.

Figure 9:
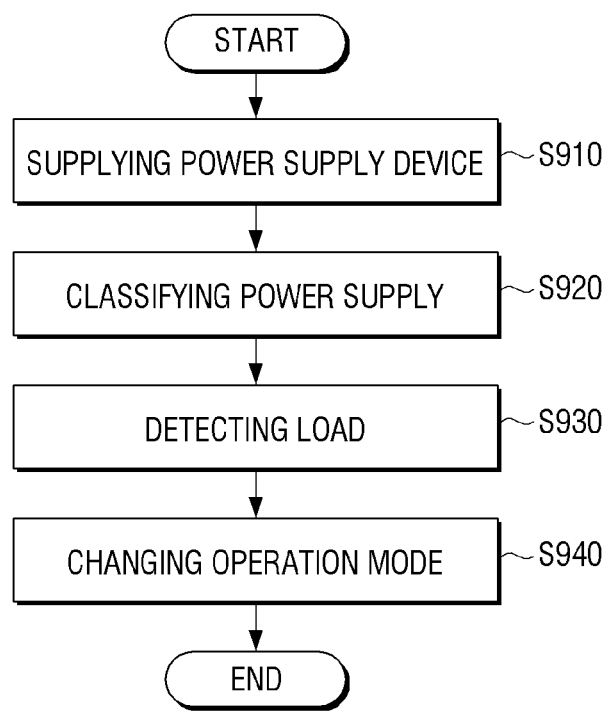
FIG. 9 is a flowchart illustrating a power supply method according to an exemplary embodiment of the present general inventive concept.

FIG. 9 is a flowchart illustrating a power supply method according to an exemplary embodiment of the present general inventive concept.

Referring to FIG. 9, power is supplied to a micro server 100 in a current sharing method by using a plurality of power supplies 400 (S910). Here, the current sharing method is a way that the plurality of power supplies 400 divides and outputs the amount of current required by a system.

Then, each of the plurality of power supplies 400 is classified as a master power supply or a slave power supply (S920). In detail, the plurality of power supplies 400 may be separated into one master power supply and at least one slave power supply by comparing the amount of current that is output from of the plurality of power supplies 400, respectively. Such operation may be performed during an initial driving operation of the system, or when any one of the power supplies 400 fails.

Then, the load in the micro server 100 is detected (S930). In detail, the load in the micro server 100 may be detected based on an amount of current of an output end. As illustrated in FIG. 9, the load is detected. However, at the time of implementation, the amount of current that can be directly measured may be used. In other words, the amount of current supplied to the system (namely, output current) can be detected.

Then, if the size of the detected load is less than or equal to a first predetermined load, at least one of the power supplies 400 separated into the slave power supplies 400 is not caused to supply power to the micro server 100 (S940). Such operation was described previously, and therefore, duplicate description will be omitted.

Since the power supply method according to FIG. 9 uses the power supply device 300 that is designed more excessively than the size of the maximum power required by the micro server 100, it can stably supply power even when one power supply 400 fails. Then, since the power supply method according to FIG. 9 operates some of the plurality of power supplies 400 adaptively depending on the load size in the micro server 100, it can operate at high power efficiency. The control operation as illustrated in FIG. 9 may be performed in a micro server 100 having the configuration of FIG. 1, a power supply device 300 having the configuration of FIG. 2, or a power supply 400 having the configuration of FIG. 3. Alternatively, the control operation as illustrated in FIG. 9 also may be performed in a micro server 100, a power supply device 300, or a power supply 400 having a different configuration.

The present general inventive concept, such as the power supply method as described above can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Figure 10:
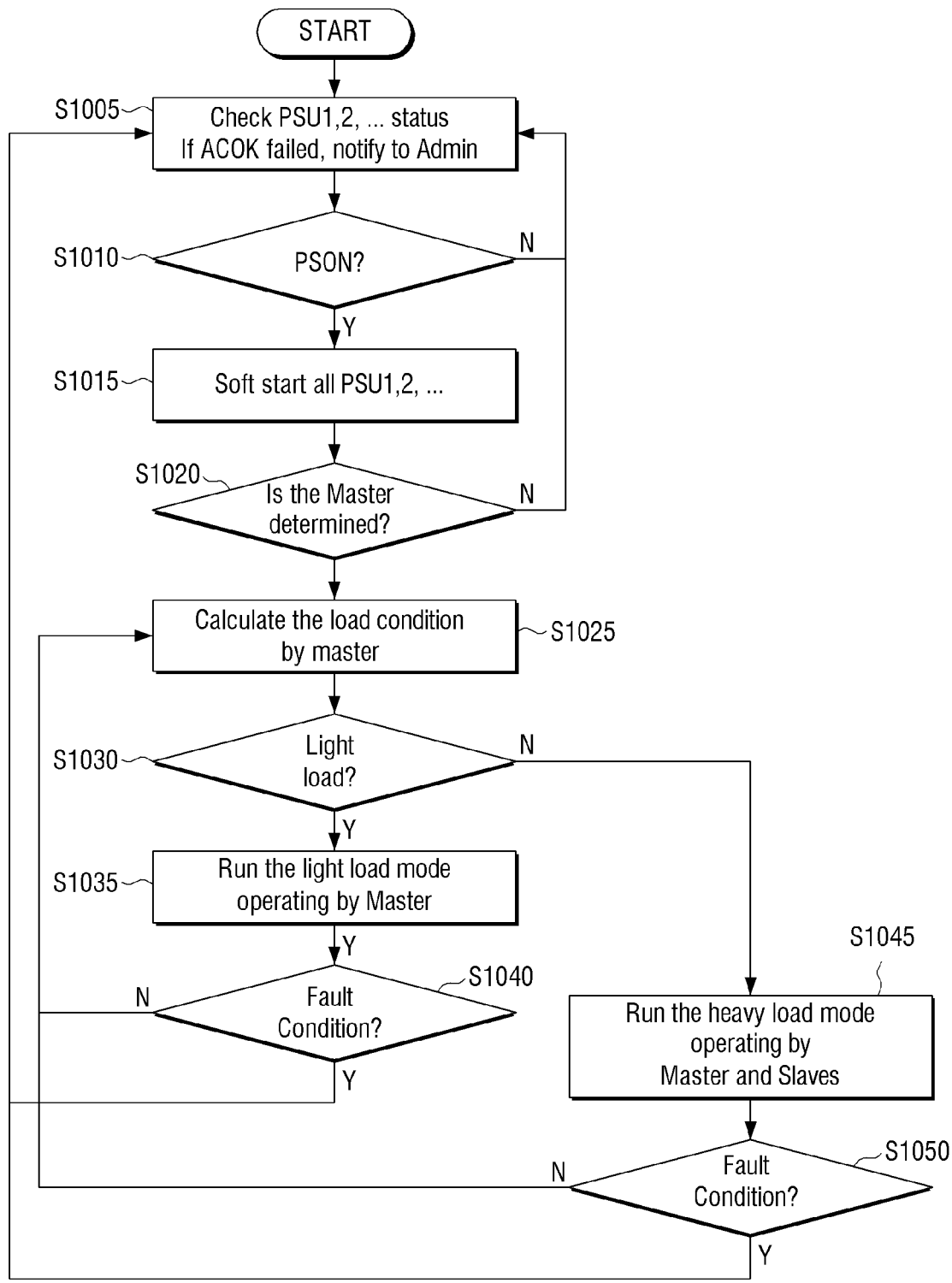
FIG. 10 is a flowchart illustrating a method of supplying power by using two power supplies according to an exemplary embodiment of the present general inventive concept.

FIG. 10 is a flowchart illustrating a method of supplying power by using two power supplies 400 according to an exemplary embodiment of the present general inventive concept.

Referring to FIG. 10, a state of each of power supplies 400 is checked, and the check result is notified to a micro server 100 (S1005). In detail, whether each of the power supplies 400 fails or not is checked, and the check result may be notified to the micro server 100. Such notification may be performed only if an error occurs in the power supplies 400.

After that, if a power on command is received from the micro server 100 (S1010), soft booting is performed within all of the power supplies 400 (S1015).

According to the soft booting, each of the power supplies 400 outputs the amount of current required by the system in a current sharing method. Based on the size of output current of each of the power supplies 400, one power supply 400 is determined as a master power supply and the remaining power supplies 400 are determined as slave power supplies (S1020).

Whether an operation mode corresponding to each of the power supplies 400 is decided is determined (S1020). If the operation mode corresponding to each of the power supplies 400 is not determined (S1020-N), occurrence of an error is notified to the micro server 100.

If the operation mode corresponding to each of the power supplies 400 is determined by such operation (S1020-Y), the master power supply detects a load condition of the system (S1025).

Then, whether the measured load is less than or equal to a first predetermined load is determined (S1030). If the measured load is more than the first predetermined load (S1030-N), all the power supplies 400 are determined to output power (S1045).

However, if the measured load is less than or equal to the first predetermined load (S1030-Y), only the master power supply is determined to output power (S1035). In other words, the slave power supplies may not output power. As illustrated in FIG. 9, if the measured load is less than or equal to the first predetermined load, only the master power supply outputs power. However, the present general inventive concept may be implemented so that only the slave power supplies output power.

After such power operation, whether an error occurs in each of the power supplies 400 is detected in real-time (S1040 and S1050).

If the error is not detected in the power supplies 400 (S1040-N and S1050-N), the above-described load detecting operation is performed repeatedly.

However, if an error is detected in at least one of the plurality of power supplies 400 (S1040-Y and S1050-Y), the error is notified to the administration server 100. On the other hand, if, when only the master power supply operates, the error occurs in the master power supply (S1040-Y), the slave power supply may be switched to output power, and the operation mode may be switched so that the slave power supply operates as the master power supply.

Figure 11:
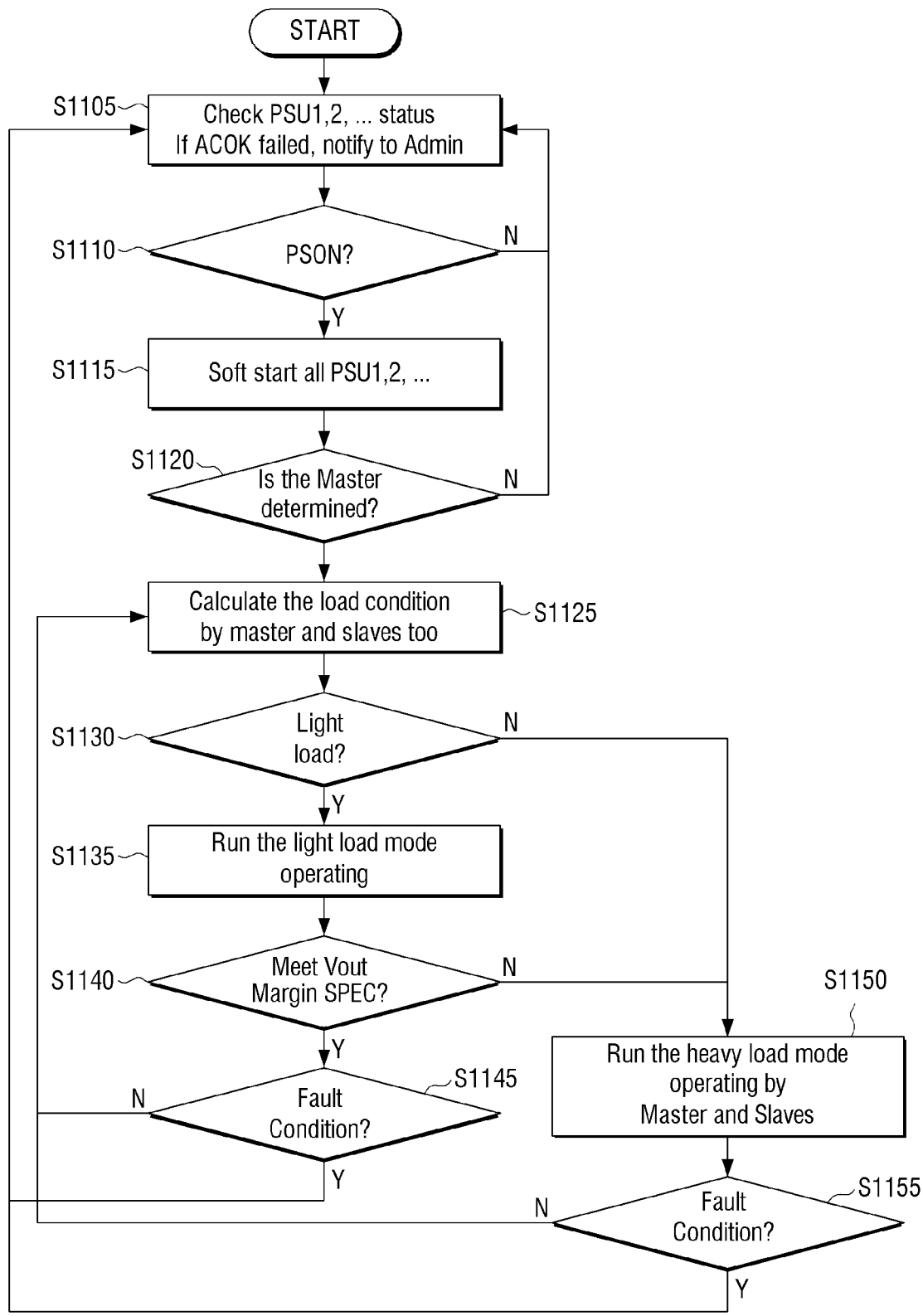
FIG. 11 is a flowchart illustrating another method of supplying power by using two power supplies according to an exemplary embodiment of the present general inventive concept.

FIG. 11 is a flowchart illustrating another method of supplying power by using two power supplies 400 according to an exemplary embodiment of the present general inventive concept.

Referring to FIG. 11, a state of each of the power supplies 400 is checked, and the check result is notified to a micro server 100 (S1105). In detail, whether each of the power supplies 400 fails is checked, and the check result may be notified to the micro server 100. Such notification may be performed only if an error occurs in the power supplies 400.

After that, if a power on command is received from the micro server 100 (S1110), soft booting is performed for all power supplies 400 (S1115).

According to the soft booting, each of the power supplies outputs the amount of current required by the system in a current sharing method. Based on the size of output current of each of the power supplies 400, one power supply 400 is determined as a master power supply and the remaining power supply 400 is determined as a slave power supply (S1120).

Whether an operation mode corresponding to each of power supplies 400 is decided is determined (S1120). If the operation mode corresponding to each of the power supplies 400 is not determined (S1120-N), occurrence of an error is notified to the micro server 100.

If the operation mode corresponding to each of the power supplies 400 is determined by such operation (S1120-Y), the master power supply detects a load condition of the system (S1125).

Then, whether the measured load is less than or equal to a first predetermined load is determined (S1130). If the measured load is more than the first predetermined load (S1130-N), all the power supplies 400 are determined to output power (S1150).

However, if the measured load is less than or equal to the first predetermined load (S1130-Y), only the master power supply is determined to output power (S1135). In other words, the slave power supply may not output power. As illustrated in FIG. 11, if the measured load is less than or equal to the first predetermined load, only the master power supply outputs power; however, it may be implemented so that only the slave power supply outputs power.

Then, even when one power supply 400 is determined to output power, whether the present output state meets a full voltage specification of the system is identified (S1140). If the power output of only one power supply 400 does not meet the voltage specification (S1140-N), all the power supplies 400 are caused to output power (S1150).

After such power operation, whether an error occurs in each of the power supplies 400 is detected real-time (S1145 and S1155).

If the error is not detected in the power supplies 400 (S1145-N and S1155-N), the above-described load detecting operation is performed repeatedly.

However, if an error is detected in at least one of the plurality of power supplies 400 (S1145-Y and S1155-Y), the error is notified to the administration server 100. On the other hand, if, when only the master power supply operates, the error occurs in the master power supply (S1145-Y), the slave power supply may be switched to output power, and the operation mode may be switched so that the slave power supply operates as the master power supply.

FIG. 12 is a flowchart illustrating an operation of the power supply 400 according to an exemplary embodiment of the present general inventive concept.

Referring to FIG. 12, before an operation mode is determined, all power supplies 400 operate in a slave mode (S1205).

Then, after an initial driving, an operation mode of each of the power supplies 400 is determined by comparing the driving current of its own and the driving currents of other power supplies 400 (S1210). In detail, if one power supply 400 outputs the largest driving current than the other power supplies 400 during the initial driving, the one power supply 400 determines its operation mode as a master mode. If one of the other power supplies 400 outputs the largest driving current, the one power supply may 400 determine its operation mode as the slave mode.

Then, the load condition is detected (S1215). In detail, the size of the load of the system may be detected by measuring an amount of output current of its own.

Then, whether the detected load condition is less than or equal to a third predetermined load is determined (S1220).

If the detected load condition is less than or equal to the third predetermined load, it may be determined so that at least one of the power supplies 400 will not operate (S1240). In detail, if the current power supply 400 operates in the master mode, it may be determined so that at least one of the other power supplies 400 will not output power, and the current power supply 400 will continuously output power. Contrary if the current power supply 400 operates in the slave mode, it is determined so that the current power supply 400 will not output power. So the current power supply may halt the power output operation.

On the other hand, if the detected load condition is greater than or equal to the third predetermined load, whether the current load is less than or equal to the first load that is larger than the third load is determined (S1225).

If the detected load is less than the first load and greater than the third load, the operation mode is determined (S1230).

If the operation mode is the master mode (S1230-Y), it may be determined so that other power supplies 400 will not output power and the current power supply 400 will continuously output power.

In contrast, if the operation mode is the slave mode (S1230-N), the current power supply 400 outputs power (S1250) or does not output power (S1255) depending on its priority (S1235).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply device to supply power to a micro server, comprising:
    a plurality of power supplies configured to be redundant and supply Direct Current (DC) power; and
    an output unit to output the DC power output from the plurality of power supplies to the micro server,
        wherein, in response to a size of output current of each of the plurality of power supplies, one of the plurality of power supplies operates as a master power supply and the remaining power supplies operate as slave power supplies,
        wherein, in response to determining operating modes of the plurality of power supplies, the master power supply calculates a load condition for the micro server;
        if the load condition for the micro server is less than or equal to a first predetermined load, a load of the micro server is run on the master power supply, and the slave power supplies do not run the load of the micro server and do not output the DC power, otherwise, the load of micro server is run on the master power supply and the slave power supplies,
        wherein each of the plurality of power supplies comprises:
            a rectifier adapted to rectify external Alternative Current (AC) power;
            a first capacitor adapted to smooth the rectified AC power;
            a DC/DC converter adapted to transform the smoothed AC power;
            an output capacitor adapted to output the transformed AC power; and
            a switch adapted to selectively output DC power stored in the output capacitor;
        wherein a power supply that does not output the DC power among the power supplies maintains the first capacitor and the output capacitor of the power supply in a stage charged with electric charges.

2. The power supply device of claim 1, wherein the master power supply and the slave power supplies equally divide and output an amount of current corresponding to the load of the micro server.

3. The power supply device of claim 1, wherein if the load of the micro server is greater than or equal to a second predetermined load, the slave power supplies that do not output the DC power output the DC power.

4. The power supply device of claim 3, wherein the second predetermined load is greater than the first predetermined load.

5. The power supply device of claim 1, wherein the slave power supplies comprises a plurality of power supplies, and a number of power supplies corresponding to the load of the micro server among the slave power supplies operate.

6. The power supply device of claim 5, wherein each of the slave power supplies outputs or does not output the power to the micro server according to a predetermined order.

7. The power supply device of claim 1, wherein each of the plurality of power supplies further comprises:
a power factor correction (PFC) adapted to match voltage and current of the rectified AC power with a same phase; and
a power controller adapted to control the switch to be turned off if a malfunction is detected in the power supplies.

8. The power supply device of claim of 7, wherein the power controller detects a size of a connected load, shares the detected load size with other power supply device, and determines at least one operation mode of the master mode and the slave mode depending on the shared load size.

9. The power supply device of claim 7, wherein the power controller detects a size of the load of the micro server, and, if the detected load of the micro server is less than or equal to the first predetermined load, controls the switch so that the DC power is not output.

10. The power supply device of claim 9, wherein even when the DC power is determined not to be output, the power controller maintains the first capacitor and the output capacitor in a state charged with electric charges.

11. A micro server, comprising:
a plurality of processor modules; and
a power supply device adapted to supply power to each of the plurality of processor modules by using a plurality of power supplies that is configured to be redundant and supplies Direct Current (DC) power,
wherein, in response to a size of output current of each of the plurality of power supplies, the power supply device classifies one of the plurality of power supplies as a master power supply and the remaining power supplies as slave power supplies,
wherein, in response to determining operating modes of the plurality of power supplies, the master power supply calculates a load condition for the micro server;
if the load condition for the micro server is less than or equal to a first predetermined load, a load of the micro server is run on the master power supply, and the slave power supplies do not run the load of the micro server and do not output the DC power, otherwise, the load of micro server is run on the master power supply and the slave power supplies,
wherein each of the plurality of power supplies comprises:
a rectifier adapted to rectify external Alternating Current (AC) power;
a first capacitor adapted to smooth the rectified AC power;
a DC/DC converter adapted to transform the smoothed AC power;
an output capacitor adapted to output the transformed AC power; and
a switch adapted to selectively output DC power stored in the output capacitor, and
wherein a power supply that does not output the DC power among the power supplies maintains the first capacitor and the output capacitor of the power supply in a stage charged with electric charges.

12. The micro server of claim 11, wherein the master power supply and the slave power supplies equally divide and output an amount of current corresponding to the load in the micro server.

13. The micro server of claim 11, wherein if the load of the micro server is greater than or equal to a second predetermined load, the power supplies that do not output the DC power output the DC power.

14. The micro server of claim 11, wherein the slave power supplies comprise a plurality of slave power supplies, and a number of slave power supplies corresponding to the load of the micro server do not output the DC power.

15. The micro server of claim 14, wherein each of the slave power supplies does not output the power to the micro server according to a predetermined order.

16. The micro server of claim 11, wherein each of the plurality of power supplies further comprises:
a power factor correction (PFC) adapted to match voltage and current of the rectified AC power with a same phase; and
a power controller adapted to control the switch to be turned off if a malfunction is detected in the plurality of the power supplies,
wherein the power controller detects a size of the load of the micro server, and if the detected load of the micro server is less than or equal to the first predetermined load, the power controller controls the switch so that the DC power is not output, and, even when the DC power is determined not to be output, the power controller maintains the first capacitor and the output capacitor in a state charged with electric charges.

17. A power supply method of supplying power to a micro server, the power supply method comprising:
rectifying external Alternative Current (AC) power to Direct Current (DC) power by using a plurality of power supplies;
supplying the power to the micro server by using the plurality of power supplies that is configured to be redundant and supplies the Direct Current (DC) power;
in response to a size of output current of each of the plurality of power supplies, classifying one of the plurality of power supplies as a master power supply and the remaining power supplies as slave power supplies;
in response to determining operating modes of the plurality of power supplies, detecting a load condition for the micro server by the master power supply;
if the detected load condition for the micro server is less than or equal to a first predetermined load, running the load of the micro server on the master supply, and not running the load of the micro server on the slave power supplies and not outputting the DC power from the slave power supplies, otherwise, running the load of micro server on the master power supply and the slave power supplies, and
maintaining a plurality of capacitors of the slave power supplies that do not output the DC power in a stage charged with electric charges.

18. The power supply method of claim 17, wherein the supplying the power comprises controlling the master power supply and the slave power supplies running the load of the micro server to equally divide and output an amount of current corresponding to the load in the micro server.

19. The power supply method of claim 17 further comprising:

allowing, if the load in the micro server is greater than or equal to a second predetermined load, the slave power supplies that do not output the DC power to output the DC power.

20. The power supply method of claim 17, wherein the slave power supplies comprise a plurality of slave power supplies, and
the not running the load of the micro server on the slave power supplies and not outputting the DC power from the slave power supplies comprises allowing a number of the slave power supplies corresponding to the load of the micro server not to supply the power.

21. The power supply method of claim 20, wherein the not running the load of the micro server on the slave power supplies and not outputting the DC power from the slave power supplies comprises allowing the slave power supplies not to supply the power sequentially in a predetermined order.

22. The power supply method of claim 20, wherein each of the plurality of power supplies comprises at least one capacitor, and
the not running the load of the micro server on the slave power supplies and not outputting the DC power from the slave power supplies comprises controlling the slave power supplies not supplying the power to maintain the at least one capacitor therein in a state charged with electric charges.

23. A power supply device to supply power to a micro server, comprising:
a power supply to operate as a master power supply to output power; and
other power supplies to operate as slave power supplies, wherein, in response to determining operating modes of the plurality of power supplies, the master power supply calculates a load condition for the micro server;
if the load condition for the micro server is less than or equal to a first predetermined load, a load of the micro server is run on the master power supply, and the slave power supplies do not run the load of the micro server and do not output the DC power, otherwise, the load of micro server is run on the master power supply and the slave power supplies, and
wherein each of the plurality of power supplies comprises:
a rectifier adapted to rectify external Alternating Current (AC) power;
a first capacitor adapted to smooth the rectified AC power;
a DC/DC converter adapted to transform the smoothed AC power;
an output capacitor adapted to output the transformed AC power; and
a switch adapted to selectively output DC power stored in the output capacitor, and
wherein the slave power supplies that do not run the load of the micro server and do not output the DC power maintain a capacitor of the power supply in a stage charged with electric charges.

24. The power supply device of claim 23, wherein the slave power supplies include a plurality of slave power supplies, and
wherein each of the plurality of slave power supplies outputs power until the size of the load of the micro server is reached, such that the plurality of slave power supplies do not output power.

25. The power supply device of claim 23, wherein the mater power supply outputs a largest amount of current during initial supply of power as compared to the slave power supplies.

* * * * *